US010120956B2

(12) United States Patent
Chen et al.

(10) Patent No.: US 10,120,956 B2
(45) Date of Patent: Nov. 6, 2018

(54) METHODS AND SYSTEMS FOR DISTRIBUTED COMPUTATION OF GRAPH DATA

(71) Applicants: GraphSQL, Inc., Mountain View, CA (US); KENT STATE UNIVERSITY, Kent, OH (US)

(72) Inventors: Li Chen, Naperville, IL (US); Ruoming Jin, Aurora, OH (US); Yu Xu, Belmont, CA (US)

(73) Assignees: GRAPHSQL, INC., Mountain View, CA (US); KENT STATE UNIVERSITY, Kent, OH (US)

( * ) Notice: Subject to any disclaimer, the term of this patent is extended or adjusted under 35 U.S.C. 154(b) by 345 days.

(21) Appl. No.: 14/839,484

(22) Filed: Aug. 28, 2015

(65) Prior Publication Data
US 2016/0063132 A1    Mar. 3, 2016

Related U.S. Application Data

(60) Provisional application No. 62/043,849, filed on Aug. 29, 2014.

(51) Int. Cl.
*G06F 17/30* (2006.01)
(52) U.S. Cl.
CPC ............... *G06F 17/30958* (2013.01)
(58) Field of Classification Search
CPC .................................. G06F 17/30958
USPC ....................................... 707/609
See application file for complete search history.

(56) References Cited

U.S. PATENT DOCUMENTS

| 5,276,783 | A  | * | 1/1994 | Fossum | G06T 15/80 345/419 |
| 6,628,281 | B1 | * | 9/2003 | Fossum | G06T 15/40 345/422 |
| 6,816,825 | B1 | * | 11/2004 | Ashar | G01R 31/318364 324/650 |
| 8,316,060 | B1 | * | 11/2012 | Snyder, II | G06F 17/30958 707/797 |
| 8,462,161 | B1 | * | 6/2013 | Barber | G06T 11/206 345/440 |

(Continued)

OTHER PUBLICATIONS

Lumsdaine et al., "Challenges in Parallel Graph Processing", Parallel Processing Letters, Mar. 2007, 16 pages. (Year: 2007).*

(Continued)

*Primary Examiner* — Phuong Thao Cao
(74) *Attorney, Agent, or Firm* — Orrick, Herrington & Sutcliffe LLP

(57) ABSTRACT

Methods and systems for distributed computation of graph data permit edge collection and vertex collection, each to be partitioned among a plurality of computational units. In one embodiment, the methods employ a two-phase computational cycle, which is repeated until the computation is complete. In a first phase, processing units process each active edge and vertex by doing the following: reading their current attribute values, executing programmed computational functions, updating edge attributes and sending data messages to vertices. In a second phase, each vertex update processor processes each of its active vertices by doing the following: reading its current attribute values and received data messages, executing a programmed computational function, and updating the vertex's attribute values.

20 Claims, 12 Drawing Sheets

(56) References Cited

U.S. PATENT DOCUMENTS

| | | | | |
|---|---|---|---|---|
| 8,736,612 | B1* | 5/2014 | Goldman | G06Q 50/01 345/440 |
| 8,793,283 | B1* | 7/2014 | Austern | G06F 17/30958 707/798 |
| 8,935,261 | B2* | 1/2015 | Piepgrass | G06F 17/30867 707/748 |
| 9,135,565 | B1* | 9/2015 | Khalefa et al. | G06F 17/30958 |
| 9,400,767 | B2* | 7/2016 | Balmin | G06F 17/10 |
| 9,652,876 | B1* | 5/2017 | Austern | G06T 11/206 |
| 9,767,217 | B1* | 9/2017 | Austern | G06F 17/30569 |
| 9,870,631 | B1* | 1/2018 | Khalefa et al. | G06F 17/30598 |
| 9,984,109 | B2* | 5/2018 | da Silva | G06F 17/30598 |
| 2006/0082596 | A1* | 4/2006 | Karlov | G06T 11/40 345/629 |
| 2007/0192084 | A1* | 8/2007 | Appleby | G06F 17/271 704/9 |
| 2008/0052378 | A1* | 2/2008 | Matsuyama | H04L 41/22 709/218 |
| 2008/0052379 | A1* | 2/2008 | Matsuyama | H04L 41/22 709/218 |
| 2009/0106289 | A1* | 4/2009 | Furusho | G06F 17/30961 |
| 2010/0036810 | A1* | 2/2010 | Wu | G06F 11/3495 707/706 |
| 2012/0084422 | A1* | 4/2012 | Bandi | H04L 41/5045 709/223 |
| 2012/0197854 | A1* | 8/2012 | Amaral | G06F 11/3604 707/705 |
| 2013/0066933 | A1* | 3/2013 | Menditratta | G06Q 30/0201 708/208 |
| 2013/0117261 | A1* | 5/2013 | Sambrani | G06F 17/30867 707/734 |
| 2013/0151456 | A1* | 6/2013 | Gionis | G06N 5/003 706/47 |
| 2013/0246731 | A1* | 9/2013 | Lee | G06F 12/0284 711/170 |
| 2014/0137130 | A1* | 5/2014 | Jacob | G06F 9/46 718/103 |
| 2014/0258196 | A1* | 9/2014 | Dhurandhar | G06N 99/005 706/20 |
| 2014/0280224 | A1* | 9/2014 | Feinberg | G06F 17/30958 707/748 |
| 2015/0026120 | A1* | 1/2015 | Chrapko | G06Q 50/01 707/609 |
| 2015/0026158 | A1* | 1/2015 | Jin | G06F 17/30958 707/722 |
| 2015/0033106 | A1* | 1/2015 | Stetson | G06F 17/30958 715/215 |
| 2015/0067695 | A1* | 3/2015 | Hamamoto | G06F 9/5016 718/104 |
| 2015/0074044 | A1* | 3/2015 | Metreveli | G06F 17/30958 707/609 |
| 2015/0154262 | A1* | 6/2015 | Yang | G06F 17/30958 707/649 |
| 2015/0170316 | A1* | 6/2015 | Balmin | G06F 17/10 345/503 |
| 2015/0186427 | A1* | 7/2015 | Logothetis | G06F 17/30958 707/776 |
| 2015/0339835 | A1* | 11/2015 | Mohr | G06T 11/206 345/440 |
| 2015/0347625 | A1* | 12/2015 | Werneck | G06F 17/30958 707/798 |
| 2015/0373049 | A1* | 12/2015 | Sharma | H04L 63/20 726/22 |
| 2016/0063132 | A1* | 3/2016 | Chen | G06F 17/30958 707/609 |
| 2016/0071233 | A1* | 3/2016 | Macko | G06T 11/206 345/440 |
| 2016/0321213 | A1* | 11/2016 | Miyamoto | G06F 17/10 |

OTHER PUBLICATIONS

Malewicz et al., "Pregel: A System for Large-Scale Graph Processing", SIGMOD' 10, 2010, pp. 135-145. (Year: 2010).*

Roy et al., "X-Stream: Edge-centric Graph Processing using Streaming Partitions", SOSP ' 13, Nov. 3-6, 2013, 17 pages. (Year: 2013).*

Patway et al., "Parallel Greedy Graph Matching Using an Edge Partitioning Approach", Proceedings of the Fourth International Workshop on High-Level Parallel Programming and Applications (HLPP' 10), 2010, pp. 45-54. (Year: 2010).*

Lichtenwalter et al., "DisNet: A Framework for Distributed Graph Computation", 2011 International Conference on Advances in Social Networks Analysis and Mining, IEEE, 2011, pp. 263-270. (Year: 2011).*

CN, First Office Action, Application No. 201510548289.5, dated May 3, 2018.

* cited by examiner

FIG. 6

| VID | State | VType | Weaker interest |
|-----|----------|--------|-----------------|
| V1  | Inactive | Person | -               |
| V2  | Inactive | Person | -               |
| V3  | Active   | Movie  | 2               |
| V4  | Active   | Movie  | -               |
| V5  | Active   | Movie  | 3               |
| V6  | Active   | Movie  | -               |

FIG. 8B

| VID | State | VType | Edge Address | Weaker interest |
|---|---|---|---|---|
| V1 | Inactive | Person | 1000 | - |
| V2 | Inactive | Person | 1150 | - |
| V3 | Active | Movie | - | 2 |
| V4 | Active | Movie | - | - |
| V5 | Active | Movie | - | 3 |
| V6 | Active | Movie | - | - |

METHODS AND SYSTEMS FOR DISTRIBUTED COMPUTATION OF GRAPH DATA

CROSS-REFERENCE TO RELATED APPLICATIONS

This application claims priority to U.S. Provisional Patent Application Ser. No. 62/043,849, which was filed Aug. 29, 2014. Priority to the Provisional Application is expressly claimed, and the disclosure of the Provisional Application is hereby incorporated by reference in its entirety and for all purposes.

FIELD

The present disclosure relates generally to graph-based relationships and more specifically, but not exclusively, to distributed computation of graph data that permits edge collection and vertex collection.

BACKGROUND

Many types of data analysis on large data sets call for, or would benefit from, a graph-oriented analysis. A graph is a data structure comprising a collection of data objects called vertices and a collection of vertex-to-vertex connections called edges. Data in which objects have relationships with other objects are naturally analyzed in graph format.

In conventional graph-oriented analyses, computations follow an iterative and propagative procedure. The conventional computation begins with an initial set of active vertices and edges. Each iteration includes a selection of a subset of the vertices and edges—which are adjacent to the active set—to become the active set for the next iteration. Thus, the computation conceptually travels through the graph, walking step by step from a vertex to an adjacent vertex.

In many applications, a drawback of conventional graph data computation is the very large number of computational steps. A typical computation needs to consider each possible path from a source vertex to one or more destination vertices. As the path length increases or the total number of vertices increases, the number of paths increases at an even faster rate. Due to the high number of paths to consider when processing a large data set, conventional graph data computational systems may be too slow.

In view of the foregoing, a need exists for an improved system for distributed computation of graph data in an effort to overcome the aforementioned obstacles and deficiencies of conventional graph-oriented analysis systems.

BRIEF DESCRIPTION OF THE DRAWINGS

FIG. 6 is an exemplary diagram illustrating another embodiment of the vertex data structure of FIG. 5.

FIG. 8B is an exemplary diagram illustrating yet another embodiment of the edge data structure of FIG. 7.

Figure 1:
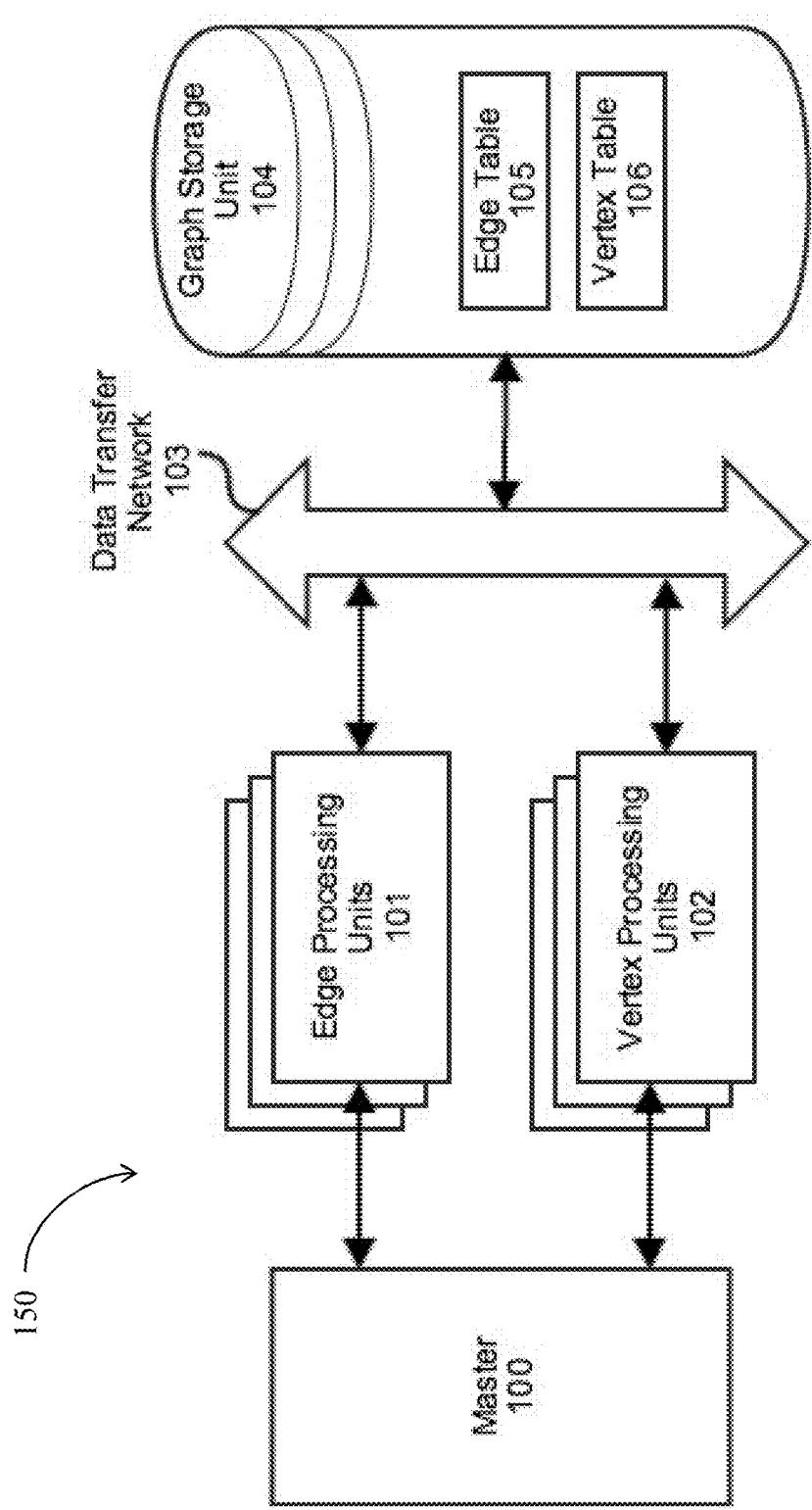
FIG. 1 is an exemplary top-level block diagram illustrating an embodiment of a distributed graph computation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available graph computation systems are deficient because they require a very large number of computational steps, a system for distributed computation of graph data that provides a reduced computation cycle can prove desirable and provide a basis for a wide range of graph computation applications, such as finding a best travel route or analyzing a graph of consumers and products to make effective recommendations. This result can be achieved, according to one embodiment disclosed herein, by a system 150 for distributed graph computation as illustrated in FIG. 1.

A graph is a data structure comprising a collection of vertices and a collection of vertex-to-vertex connections called edges. Each of the two vertices that define an edge is referred to as one of the edge's endpoint vertices. A directed edge designates one endpoint vertex to be the source vertex and the other to be the target vertex. Each vertex and each edge has descriptive attributes whose values may be read and updated during the distributed graph computation. In some embodiments, the system 150 for distributed graph computation permits edge collection and vertex collection, each collection to be partitioned among a plurality of computational units.

Specifically, referring to FIG. 1, the system 150 includes a Master 100 for coordinating the operation of one or more Edge Processing Units (or EPUs) 101 and one or more Vertex Processing Units (or VPUs) 102. The EPUs 101 and the VPUs 102 access a Graph Storage Unit (or GSU) 104 via a Data Transfer Network 103. The GSU 104 can include one or more electronic data storage devices. For example, as illustrated in FIG. 1, the GSU 104 includes a Vertex Table 106 and an Edge Table 105. Taken together, the values stored in the Vertex Table 106 and the Edge Table 105 (e.g., vertex data and edge data, respectively) represent graph data.

A key challenge in conventional distributed and parallel data processing is sequencing and synchronization of write and read operations among multiple processors. A write operation changes the value of some data item. Because of this change, the timing of a write operation (e.g., before or after a read operation) may affect the computational result. In some embodiments, methods for distributed computation of graph data employ a two-phase computational cycle, which can be repeated until the computation is complete. The two phases advantageously separate reading from writing, to simplify the synchronization of operations among the processors.

Figure 2:
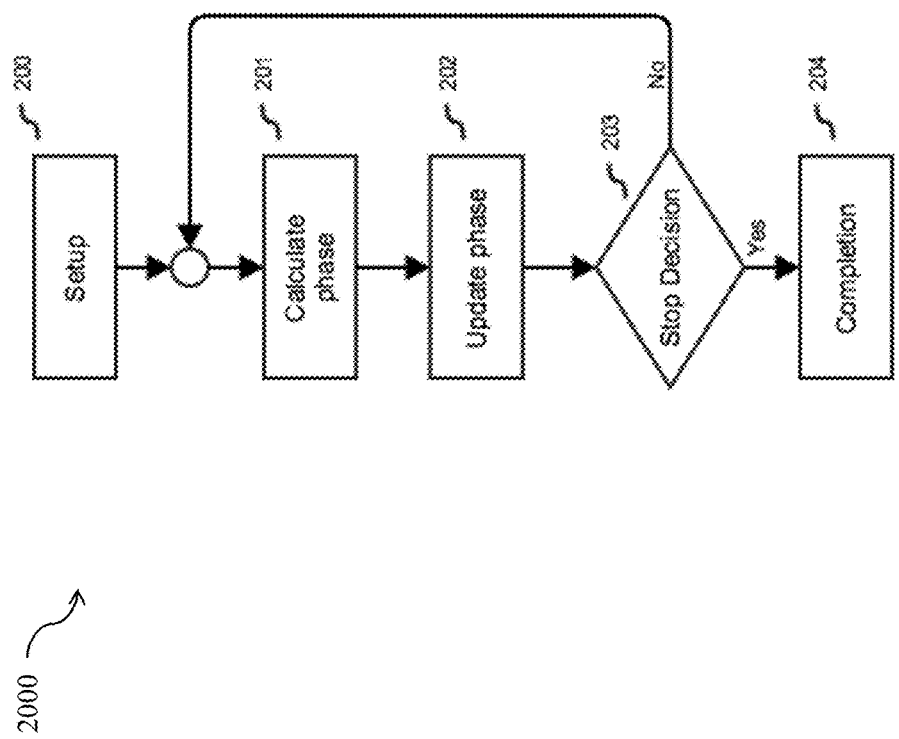
FIG. 2 is an exemplary flowchart illustrating one embodiment of a method for two-phase graph computation using the distributed graph computation system of FIG. 1.

Turning now to FIG. 2, one embodiment of a two-phase graph computation method 2000 that can be used with the system 150 is shown. The computation method 2000 includes two phases: a Calculate phase 201 and an Update phase 202. The two phases, in order, collectively are referred to as a Calculate-Update sequence. During the Calculate phase 201, the system 150 reads edge and vertex attribute values and performs calculations, but may not modify any edge or vertex attribute values. The Calculate phase 201 is followed by the Update phase 202, in which the system 150 updates attribute values of active vertices based on the calculations in the Calculate phase 201. The Calculate-Update sequence is repeated until the conditions of a Stop Decision 203 are satisfied. The conditions required to satisfy the Stop Decision 203 can be programmed based on the application of the two-phase graph computation method 2000. For example, some applications stop after a predetermined number of iterations of the Calculate-Update sequence. In other applications, the conditions of the Stop Decision 203 are satisfied when an attribute value reaches a predetermined target value. In some embodiments, the iterations of the Calculate-Update sequence can be preceded by a Setup step 200 and followed by a Completion step 204.

In some embodiments, the Update phase 202 does not begin until all operations in the Calculate phase 201 have completed. An advantage of such embodiments is that the system 150 can easily avoid race conditions among the updates of the several vertices in the Vertex Table 105. A race condition is an undesirable condition in which an outcome depends upon which of two or more update actions completes more quickly. In other embodiments, selective parts of the Update phase 202 may begin while the Calculate phase 201 is in progress if the data attributes that such parts modify will have no effect on the Calculate phase 201 operations still in progress. Such embodiments require an awareness of the dependencies between data attributes. Conversely, if all operations of the Calculate phase 201 must complete before beginning the Update phase 202, then the system 150 guarantees that all dependencies have been resolved; no detailed checking of dependencies is required.

Figure 3:
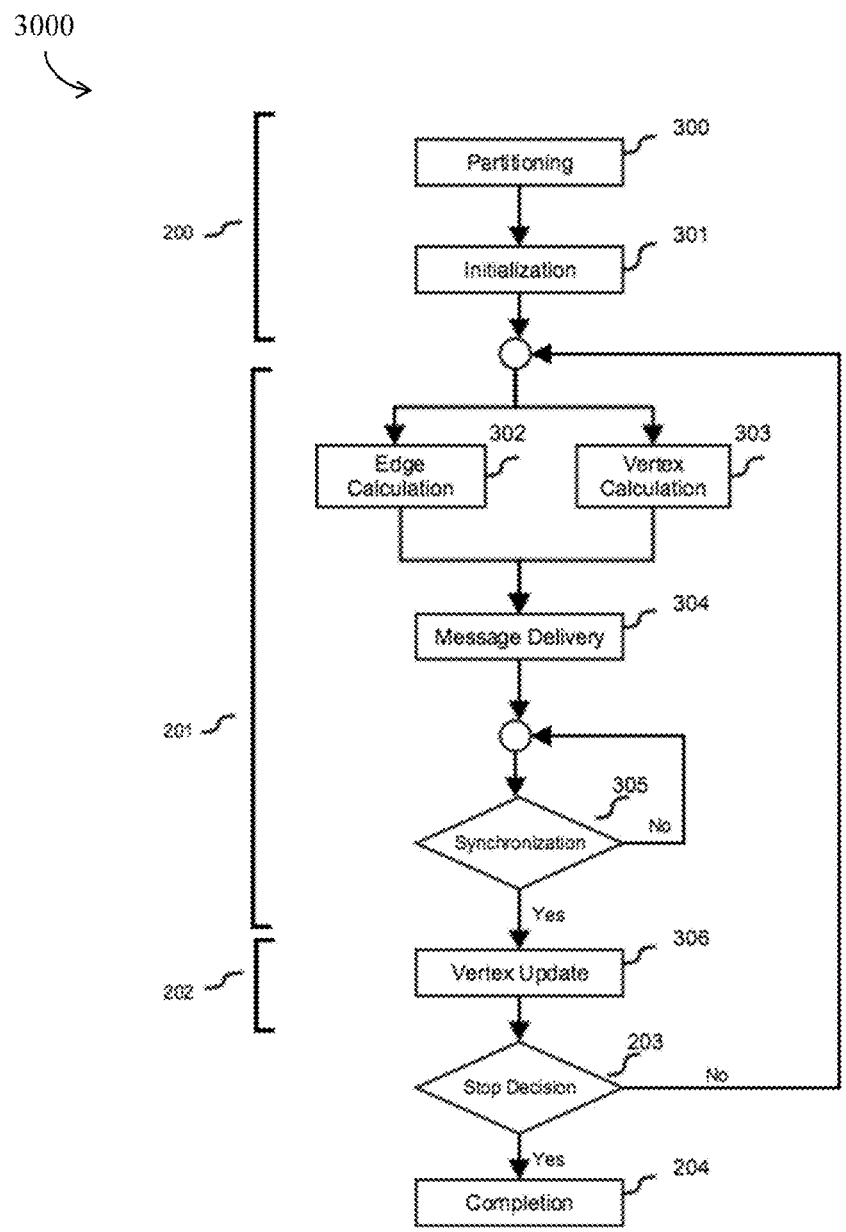
FIG. 3 is an exemplary flowchart illustrating one embodiment for processing graph data using the two-phase graph computation method of FIG. 2.

With reference to FIG. 3, the two-phase graph computation method 2000 can be used to perform distributed computation of any graph data, such as shown in a process 3000. The Setup step 200 includes two sub-steps: a Partitioning step 300 and an Initialization step 301. Similarly, the Calculate phase 201 includes four sub-steps: an Edge Calculation step 302, a Vertex Calculation step 303, a Message Delivery step 304, and a Synchronization step 305. The Update phase 202 includes a Vertex Update step 306.

Figure 4:
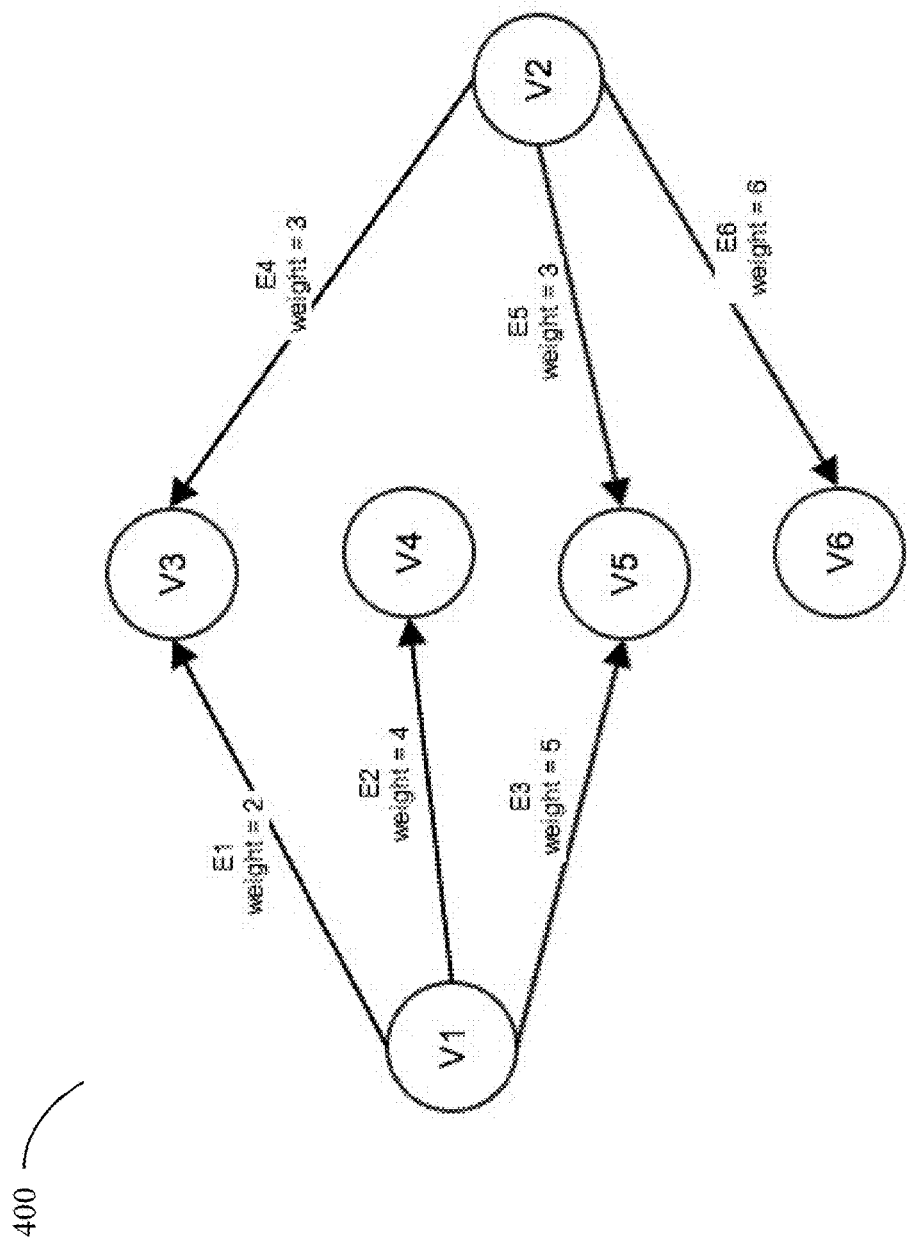
FIG. 4 is an exemplary diagram illustrating an embodiment of a sample graph having edges and vertices.

To better illustrate the process 3000, an example graph 400 and an example computational application are also described with reference to FIG. 4. Turning now to FIG. 4, the graph 400 includes six vertices V1-V6 and six directed, weighted edges E1-E6. The graph 400 can represent any number of practical applications, such as, for example, data related to movies two people both enjoy. For example, the vertices V1-V6 can represent Person vertices V1 and V2 and Movie vertices V3-V6. The weight attribute of each of the Person-Movie edges E1-E6 can represent the level of interest that a particular Person (e.g., V1 or V2) has in a particular Movie. A weight of 1 can represent the lowest level of interest and higher values can represent higher interest. Given this sample graph, the process 3000 can be used to return a list of Movies for which Persons V1 and V2 have expressed a mutual Interest. Moreover, for each returned Movie V3-V6, the process 3000 can return the lesser of the two Interest values (because the Person who is less interested has the final say). This sample computation using the process 3000 only requires a single iteration.

Partitioning step 300: In some embodiments, the process 3000 begins when the Master 100 partitions the Edge Table 105 such that each edge E1-E6 of the graph data is assigned to one EPU 101. Likewise, the Master 100 partitions the vertices among the VPUs 102. Stated in another way, the Partitioning step 300 is used to divide the workload among multiple processors (e.g., EPUs 101 and VPUs 102). In some embodiments, the final results of the method 2000 advantageously are independent from how the edges and vertices are partitioned.

Initialization step 301: In some embodiments, the process 3000 begins or continues when the Master 100 initializes the system 150. The Initialization step 301 can include selecting which edges E1-E6 and vertices V1-V6 are initially in an Active state. An edge or vertex that is in the Active state participates in the current iteration of the Calculate phase 201; accordingly, edges and vertices that are Inactive (that is, not in the Active state) do not participate. The Initialization step 301 can also include: setting edge and vertex attributes to initial values (e.g., setting a Movie vertex attribute for average_Interest to 0) for the first iteration of the Calculate-Update sequence, programming the functions of the Calculate phase 201 for each EPU 101 and VPU 102, programming the functions of the Update phase 202 for each VPU 102, programming a Stop Condition for the Stop Decision 203, and programming Completion functions of the Completion step 204.

Using the movie recommendation example above, in order to determine which Movie vertices V3-V6 are directly connected to both Person vertices V1 and V2, the Master 100 initializes the vertices V1 and V2 to be Active. Any edge having vertex V1 or V2 as a source vertex is an Active edge for this iteration. The Master 100 programs each EPU 101 to have a Calculate function (for the Calculate phase 201) that causes each Active edge of the EPU 101 to send to its target vertex a data message. The data message can include an ID code of the Active edge's source vertex and the Active edge's Interest value. The Master 100 also programs each VPU 102 to have an Update function (for the Update phase 202) that causes each vertex of the VPU 102 to collect and inspect the data messages that the vertex receives from the EPUs 101. The Update function for each VPU 102 also instructs the VPU 102 that if the set of data messages that any one vertex receives from the EPUs 101 includes ID codes for both Person vertices V1 and V2, then the VPU 102 sends a data message containing the ID of the receiving vertex and the lesser of the two Interest values to the Master 100. The Stop Condition for this example is to stop unconditionally after the first iteration. The specific messages sent and received for the graph 400 will be given during the description of the next steps of the process 3000.

Edge Calculation step 302: After the Initialization step 301, the process 3000 begins the Edge Calculation step 302 simultaneously with the Vertex Calculation step 303. In the Edge Calculation step 302, each EPU 101 performs calculations upon its Active edges, according to the Calculate function set by the Master 100 during the Initialization step 301. For each Active edge, the responsible EPU 101 may update the Active edge's own attributes. Additionally, the EPU 101 may send some of the Calculate function results as a data message during the Message Delivery step 304 to one or both of the Active edge's endpoint vertices.

In the example graph 400, every edge is Active because every edge's source vertex is either the vertex V1 or V2. The edge Calculate function sends a data message containing the edge's source vertex ID and the edge's Interest to its target vertex. For example, the edge E1 sends the data message (V1, 2) to the vertex V3. Likewise, the edge E2 sends the data message (V1, 4) to vertex V4, the edge E3 sends the data message (V1, 5) to the vertex V5, the edge E4 sends the data message (V2, 3) to the vertex V3, the edge E5 sends the data message (V2, 3) to the vertex V5, and the edge E6 sends the data message (V2, 6) to the vertex V6.

Vertex Calculation step 303: Some embodiments of the process 3000 may find it advantageous to include a Vertex Calculation step 303. In the Vertex Calculation step 303, each VPU 102 performs calculations upon its Active vertices according to the Calculate function set by the Master 100 during the Initialization step 301. The Vertex Calculation step 303 considers the attribute values of each Active vertex and calculates new attribute values for that vertex. In some embodiments, the VPU 102 may compute data values to be sent as a data message during the Message Delivery step 304 to a vertex other than the Active vertex. In the movie example using the graph 400 above, there is no vertex Calculate function, so vertex attribute values do not change.

Message Delivery step 304: The VPUs 102 and the EPUs 101 deliver the data messages constructed during the Edge Calculation step 302 and the Vertex Calculation step 303. For example, the six data messages for the example of graph 400 which are described in the Edge Calculation step 302 above are delivered to their respective destination vertices.

Synchronization step 305: In some embodiments, the Synchronization step 305 begins when the Message Delivery step 304 begins. The Master 100 monitors the activity of the EPUs 101, the VPUs 102, and the Data Transfer Network 103 to determine whether vertex and edge calculations are complete. When all the EPUs 101 and the VPUs 102 have completed the Edge Calculation step 302, the Vertex Calculation step 303, and the Message Delivery step 304, the Master 100 permits the VPUs 102 to start the Vertex Update step 306. In the movie example above, the Master 100 will wait until the vertex V3 receives two data messages, the vertex V4 receives one data message, the vertex V5 receives two data messages, and the vertex V6 receives one data message before executing the Vertex Update step 306.

Vertex Update step 306: In the Vertex Update step 306, each VPU 102 processes those vertices that received a data message, according to the Update function set by the Master 100 during the Initialization step 301. For each receiving vertex, the VPU 102 computes new values for specified attributes and updates the attributes of the receiving vertex. Additionally, the VPUs 102 update the state of each of its vertices; only those vertices that received a message will be Active in the next iteration. Lastly, the VPUs 102 can send the data attributes of vertices to the Master 100.

In the movie example, the VPUs 102 search the vertices V3-V6 to identify those vertices that received data messages from both the vertices V1 and V2. When such a recipient vertex is found, the VPU 102 constructs a data message for the Master 100 that includes the ID of the recipient vertex and the lesser of the two Interest values from the data messages. For example, the vertices V3 and V5 satisfy the requirements. The vertex V3 received the data messages [(V1, 2), (V2, 3)], so its VPU 102 sends the data message (V3, 2) to the Master 100. The vertex V5 received the data messages [(V1, 5), (V2, 3)], so its VPU 102 sends the data message (V5, 3) to the Master 100.

Stop Decision 203: After the Vertex Update step 306, the Master 100 applies the Stop Condition set during the Initialization step 301 to determine what to do next. If the Stop Condition is satisfied, the Master 100 proceeds to the Completion step 204. If the Stop Condition is not satisfied, the Master 100 starts the Calculate-Update sequence again, starting with the simultaneous Edge Calculation step 302 and the Vertex Calculation step 303. Using the movie example, the Stop Condition is to stop after one iteration, so the process 3000 proceeds to the Completion step 204.

Completion step 204: In the Completion step 204, the Master 100 performs any final post-iteration calculations as specified in the Completion functions set during the Initialization step 301. In the movie example, there is no Completion function. The Master 100 will receive the two messages (V3, 2) and (V5, 3), and this is the final result. Practically, the result can represent that the two persons represented by the Person vertices V1 and V2 both are interested in the movie represented by the Movie vertex V3 with a minimum interest level of 2 and also in the movie represented by the Movie vertex V5 with a minimum interest level of 3. In an expanded example, a Completion function could select the recommended movie with the highest interest level. For the graph 400, the selected movie would be represented by the vertex V5, because its mutual interest level of 3 is greater than the mutual interest level of 2 of the vertex V3.

Advantageously, the process 3000 avoids race conditions through separation of responsibility and restricting when write updates are permitted. Each edge has only one EPU 101 and each vertex has only one VPU 102 that is authorized to change its attribute values. Moreover, by separating the Calculate phase 201 from the Update phase 202, the edge and vertex attribute values are stable when they are needed as input values for the Edge Calculation step 302 and the Vertex Calculation step 303. The Synchronization step 305 guarantees that the Edge Calculation step 302 and the Vertex Calculation step 303 have finished before permitting the vertex values to change during the Vertex Update step 306.

Since only one EPU 101 has authorization to read and write a given edge, the process 3000 has greater freedom for the timing of updating edge values than for the timing of updating vertex values. In a preferred embodiment, each EPU 101 updates the values of each of its Active edges during the Edge Calculation step 302, as soon as the EPU 101 has calculated the new values. In an alternative embodiment, the edge attribute updates occur in parallel with the Vertex Update step 306.

The operations described with reference to the process 3000 are for illustration only and not intended to be exhaustive. Additional operations and components may be included between or alongside the operations that are shown.

Structure and Organization of Graph Tables

Figure 5:
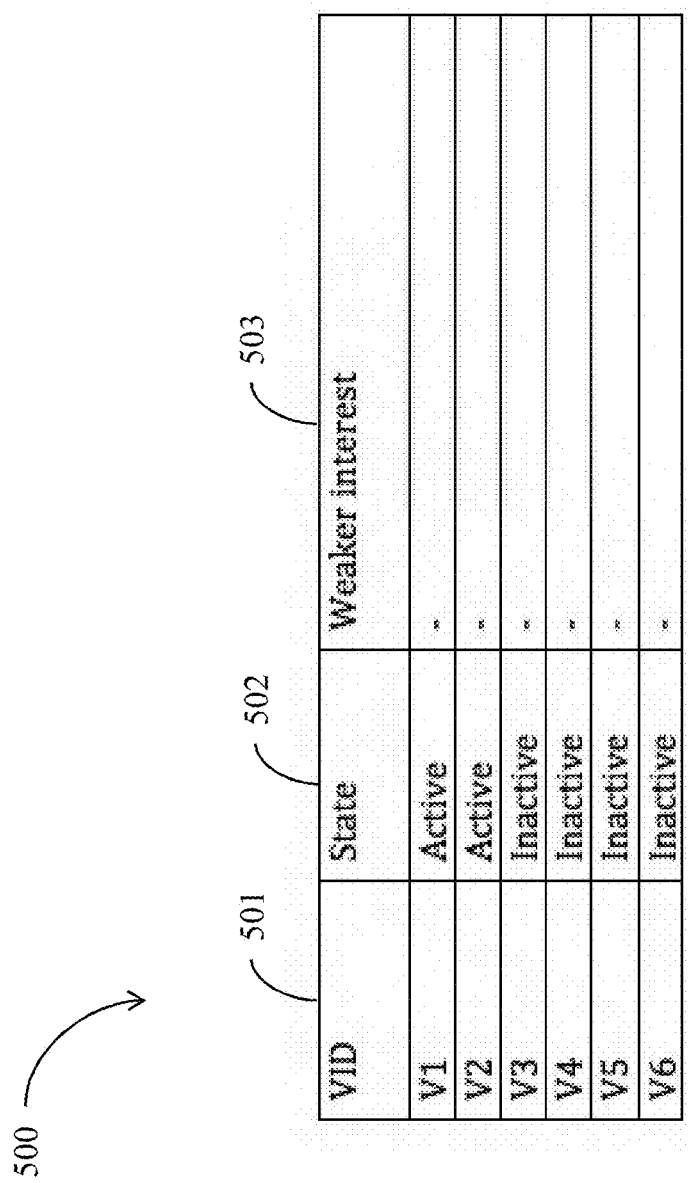
FIG. 5 is an exemplary diagram illustrating an embodiment of a vertex data structure that can be stored in the Vertex Table of the distributed graph computation system of FIG. 1.

With reference now to FIG. 5, a sample vertex data structure 500 that can be stored in the Vertex Table 106 is shown. In one embodiment, each vertex data structure 500 contains a Vertex Identification value (VID) 501, a State 502 indicating whether the vertex is in the Active or Inactive state, and Additional vertex attributes 503 (e.g., Weaker interest) that describe vertices as needed for particular applications. The sample entries shown in the vertex data structure 500 include the attributes of the vertices of the graph 400, in their state at the Initialization step 301. The Additional vertex attributes 503 as shown in FIG. 5 are set to represent a Weaker interest level (e.g., the level of joint interest in a movie), according to the movie example above. If a movie has joint interest, then the Weaker interest is the lesser of the interest levels of the two interested Persons.

The Vertex Table 106 as a whole may be any suitable computer data structure, such as an array or a hash table. The Vertex Table 106 may be partitioned into segments that collectively represent the Vertex Table 106. There may be more than one copy of the Vertex Table 106. In a preferred embodiment, the VID 501 values are consecutive integers, each Vertex uses an equal amount of memory, and the Vertex Table 106 is stored as an array, with vertices stored in sorted order, according to values of the VID 501. This embodiment permits rapid determination of the physical location of each vertex.

With reference now to FIG. 6, an alternative embodiment of the sample vertex data structure 500 is shown as a sample vertex data structure 600. The sample vertex data structure 600 is similar to the sample vertex data structure 500 and further includes a Vertex Type (VType) 601. The VType 601 can be used to store the type or category of each vertex. This usage enables easy filtering of vertices during processing. The sample entries shown in the vertex data structure 600 include the vertices of the graph 400, in their state after the Vertex Update step 306 of the movie recommendation computation. The sample values for the VType 601 indicate that vertices V1 and V2 are Person type, while the other vertices are Movie type. The State 502 of vertices is different now than at the Initialization step 301, and joint interest levels (e.g., Weaker interest) are recorded in the Additional vertex attributes 503.

Figure 7:
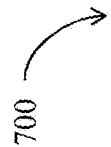
FIG. 7 is an exemplary diagram illustrating an embodiment of an edge data structure that can be stored in the Edge Table of the distributed graph computation system of FIG. 1.

With reference now to FIG. 7, a sample edge data structure 700 that can be stored in the Edge Table 105 is shown. In one embodiment, each edge data structure 700 contains a Source Vertex ID 701, a Target Vertex ID 702, an Edge Type (EType) 703, and Additional edge attributes 704 (e.g., Interest) that further describe edges as needed for particular applications. The sample entries shown in the edge data structure 700 include the attributes of the edges E1-E6 of the graph 400. The Additional edge attributes 704 as shown in FIG. 7 are set to represent an Interest level (e.g., the level of interest that the person represented by the Source Vertex ID 701 has in the movie represented by the Target Vertex ID 702).

Advantageously, an additional Edge ID attribute, analogous to the VID 501, is not required, because each edge is already uniquely identified by the SourceVertex ID 701, the TargetVertex ID 702, and the Edge Type 703. The Edge Table 105 as a whole may be any suitable computer data structure, such as an array or a hash table. The Edge Table 105 may be partitioned into segments that collectively represent that table. There may be more than one copy of the Edge Table 105.

As shown, the source and target vertices of an edge are identified by the VID numbers defined in the Vertex Table 106. However, in some preferred embodiments, the source and target vertices are identified by memory addresses. These preferred embodiments advantageously enable rapid access to the vertices' data without any additional memory lookup.

Figure 8A:
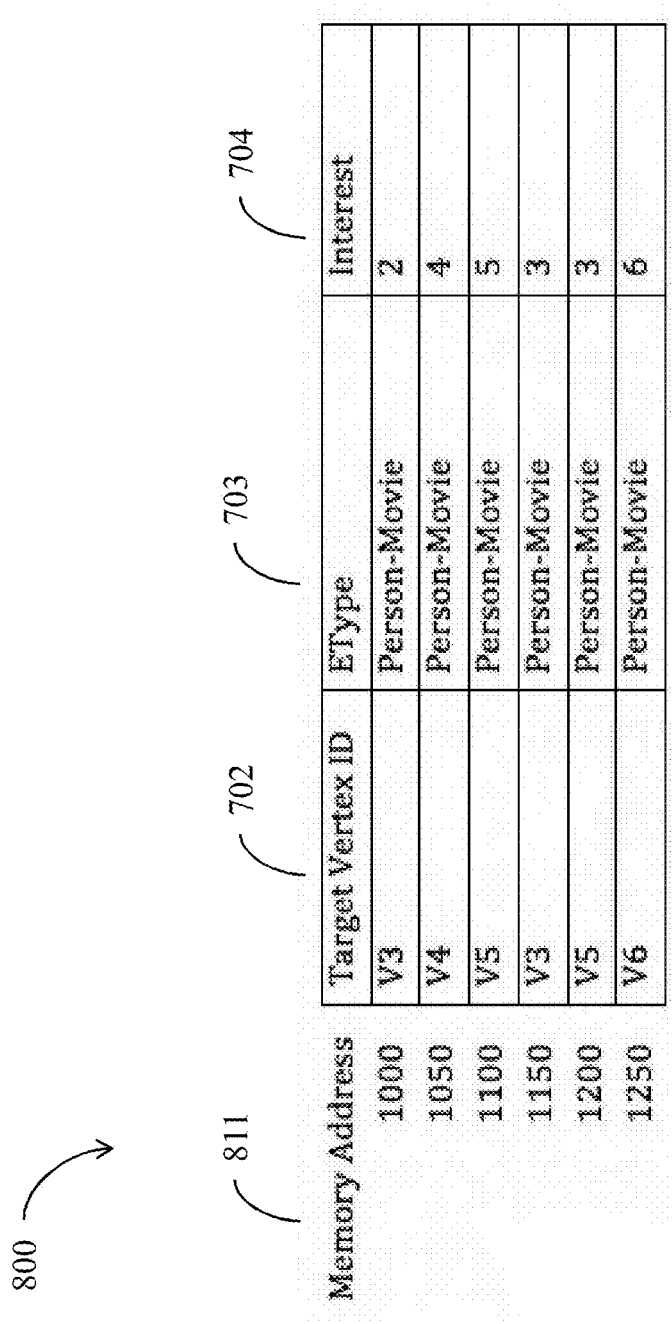
FIG. 8A is an exemplary diagram illustrating yet another embodiment of the vertex data structure of FIG. 5.

By storing edges in a certain order, some embodiments can remove one column of the sample edge data structure 700, thereby reducing the overall memory needed to store a graph. For example, referring now to FIG. 8A, a reduced edge table 800, which is another embodiment of the sample edge data structure 700 in which all of the edges that share the same source vertex are stored in adjacent memory locations, is shown. The sample entries shown in the reduced edge table 800 include the edges of the graph 400. As shown, the Source Vertex ID 701 is not included in the reduced edge table 800 because a Memory Address 811 can be substituted to locate individual edges. Although one possible set of addresses for the Memory Address 811 is shown, the Memory Address 811 may not be included in the contents of the reduced edge table 800.

Turning now to FIG. 8B, in exchange for removing the Source Vertex ID 701 from the reduced edge table 800, an extended vertex table 810 includes an additional field an Edge Address 801. The sample entries shown in the extended vertex table 810 include the vertices of the graph 400, in their state after the Vertex Update step 306. Each vertex uses the Edge Address 801 to store the memory address of one edge whose source vertex is this vertex. In such an embodiment, a component of the system 150 (e.g., an EPU 101) can locate an edge by performing the following procedure: first find the edge's source vertex as the VID 501 in the extended vertex table 810, go to the address recorded in the Edge Address 801 of that vertex, and then scan the block of edges stored in adjacent locations until the edge with the desired target vertex value is found.

For example, to find the directed edge (V1, V5): look up vertex V1 in the extended vertex table 810, go to the Edge Address 801 for the vertex V1 (i.e., address 1000), and scan the edge data structures stored near address 1000 until the vertex V5 is found. The vertex V5 is found at address 1100, two edges after the edge at address 1000.

Though an attribute (e.g., the Edge Address 801) was added to the Vertex Table 106 in exchange for removing one attribute (e.g., the Source Vertex ID 701) from the Edge Table 105, there is a net memory savings, because a connected graph always has at least as many edges as vertices.

The Graph Storage Unit 104 can include any electronic data storage device or devices capable of bearing the Vertex Table 106 and the Edge Table 105 and capable of sending data to and receiving data from the EPUs 101 and the VPUs 102. This includes, but is not limited to, persistent storage devices such as magnetic hard disks and solid state memory drives, as well as nonpersistent memory devices, such as DRAM.

Processing Units

Each EPU 101 is a programmable computational device that can be assigned a plurality of edges and can perform the EPU 101 tasks in the process 3000 for its assigned edges. The EPU 101 tasks include but are not limited to the Edge Calculation step 302. Each EPU 101 processes each of its assigned edges independently. For each assigned edge, the EPU 101 operates by reading the edge data structure 700 and the vertex data structures 500 of its endpoint vertices, performing the Edge Calculation step 302 on that data, optionally updating its own edge attributes, and sending data messages addressed to vertices via the Data Transfer Network 103.

Each VPU 102 is a programmable computational device that can be assigned a plurality of graph vertices and can perform the VPU 102 tasks in the process 3000 for its assigned vertices. The VPU 102 tasks include but are not limited to the Vertex Calculation step 303 and the Vertex Update step 306. In some embodiments, there are two varieties of VPUs 102: those that perform the Vertex Calculation step 303 and those that perform the Vertex Update step 306. In some other embodiments, there is one variety of VPU 102 that is programmed to perform both the Vertex Calculation step 303 and the Vertex Update step 306.

The VPU 102 processes each of its assigned vertices independently. In some embodiments, each VPU 102 that performs the Vertex Update step 306 contains a data structure capable of holding multiple incoming data messages. In some embodiments, each VPU 102 that perform the Vertex Update step 306 can perform a combining function that can combine multiple incoming messages into a single message.

Each EPU 101 and each VPU 102 may be a physically distinct computation unit, such as a computer or a microprocessor, or each EPU 101 and each VPU 102 may be a software construct. In some embodiments, a plurality of software EPUs 101 and VPUs 102 are contained within the same physical computer.

For particular computation applications, the function for the Edge Calculation step 302 may be null or the function for the Vertex Calculation step 303 may be null. For example, in the movie recommendation application presented earlier, there is no function for the Vertex Calculation step 303.

Data Transfer Network

The Data Transfer Network 103 is any medium and protocol for data transfer between the EPUs 101, the VPUs 102, and the Graph Storage Unit 104. For example, the Data Transfer Network 103 may be, but is not limited to, internal data buses within a computer, local area networks like Ethernet, and global scale networks including, for example, the Internet and the World Wide Web. In some embodiments, the Data Transfer Network 103 is a plurality of independent data networks, allowing for simultaneous transfer of data messages.

Data Messages

As a part of the Edge Calculation step 302 and the Vertex Calculation step 303, the EPUs 101 and/or the VPUs 102 generate data messages, addressed to particular vertices and its respective VPU 102. A data message includes one or more data values. For some embodiments, the data values of the data message are derived from a subset of the sender's attribute values. That is, the sender edge or vertex uses the data message to tell the recipient vertex something about the sender's state. The particular way in which the data values are computed and structured depends on the particular programmed function for the Edge Calculation step 302 or the Vertex Calculation step 303. For example, for the movie recommendation application described earlier, the body of the data message is the Source Vertex ID 701 and the Interest 704 of the sending edge. In other computations, the message is an array or list of values. In some other computations, the messages contain multiple segments, each segment being either a single value or an array of values.

Some embodiments find it convenient for the data message to include identifiers for the recipient vertex and the VPU 102 of the recipient vertex, analogous to how a postal letter bears a mailing address. However, there is no explicit requirement that the message contain this addressing information, as long as the system 150 is capable of delivering each data message to the intended recipient (e.g., the target VPU 102). For example, when the VPUs 102 perform the Vertex Calculation step 303, some of the VPUs 102 may construct data messages addressed to themselves, to be sent during the Vertex Update step 306. For such data messages, the VPUs 102 only need to store the data messages' data values locally until the Vertex Update step 306. Such data messages do not need address information, nor do such data messages need to use the Data Transfer Network 103.

Management of Active Edges and Vertices

The system 150 and the two-phase graph computation method 2000 can manage and control the evolving status of Active edges and vertices, so as to minimize the number of Active edges and vertices. The Master 100, the EPUs 101, and the VPUs 102 all play a role in the management of the Active state. Keeping the number of active edges and vertices to a minimum contributes to time and energy efficiency.

Figure 9:
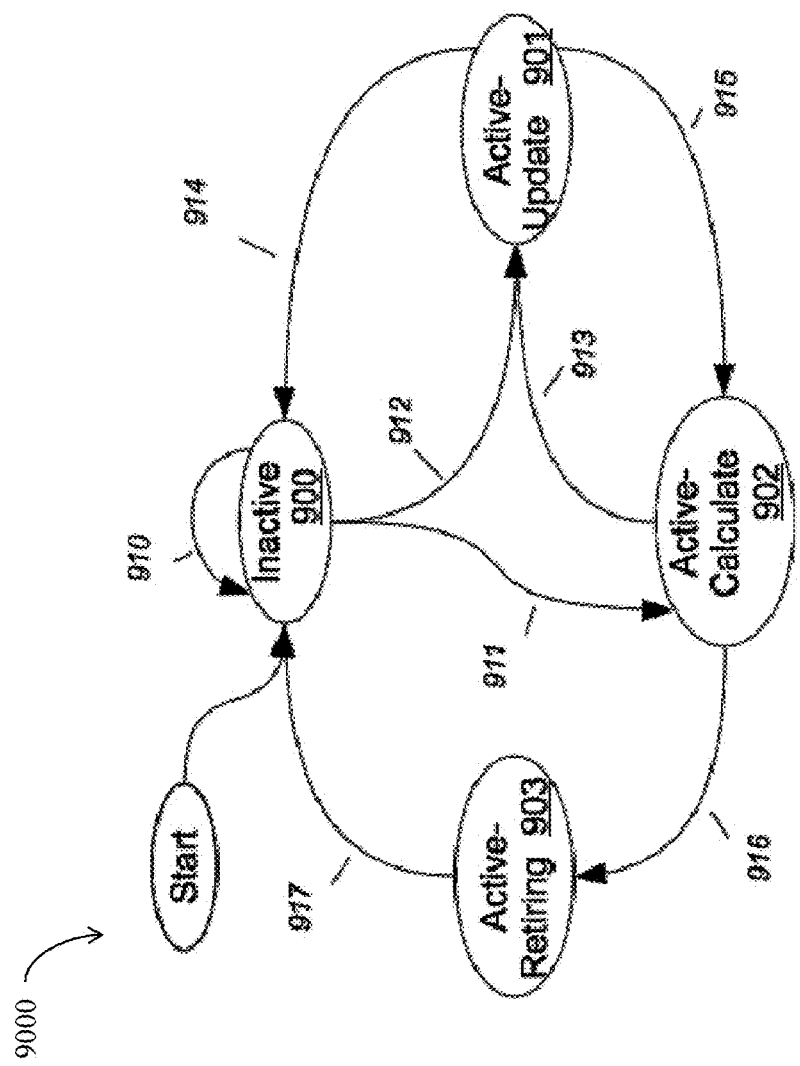
FIG. 9 is an exemplary diagram illustrating one embodiment of a state machine for a vertex using the two-phase graph computation method of FIG. 2.

Referring now to FIG. 9, one embodiment of a State Transition diagram 9000 for vertices in a graph (e.g., the graph 400) is shown. The states of edges are governed by the states of vertices: an edge is Active if and only if its source vertex is Active. While the Vertex Table 106 only needs to record two possible values for the State 502 (e.g., Active or Inactive) to understand the state transitions, it is instructive to consider the Active state as the sum of three sub-states. From this perspective, there are four possible vertex states: an Inactive state 900, an Active-Update state 901, an Active-Calculate state 902, and an Active-Retiring state 903. Stated in another way, states are a property of each individual vertex or edge, whereas the phases described with reference to the two-phase graph computation method 2000 and the process 3000 are a property of the system 150 as a whole. State transitions occur, however, when phase changes occur, as described below.

When the system 150 is not in use, all vertices are in the Inactive state 900. During the Setup step 200, the Master 100 selects some vertices to be the starting points for the computation. These selected vertices satisfy a condition 911 to move from the Inactive state 900 to the Active-Calculate state 902. In general, transitions occur when the system 150 is entering either the Calculate phase 201 or the Update phase 202.

During the Calculate phase 201, each vertex is in either the Inactive state 900 or the Active-Calculate state 902. Active vertices will undergo the Vertex Calculation step 303 and edges with an Active endpoint vertex will undergo the Edge Calculation step 302. Active edges may send data messages to vertices. As the Calculate phase 201 concludes and the Update phase 202 begins, each vertex transitions to another state. If a vertex was in the Inactive state 900 but received a data message (condition 912), the vertex will enter the Active-Update state 901. If an Inactive vertex did not receive any messages (condition 910), the vertex will remain Inactive. If an Active vertex received a message (condition 913), the vertex will move to the Active-Update state 901. If a vertex was Active but didn't receive a message (condition 916), then the vertex transitions to the Active-Retiring state 903.

In the Update phase 202, any vertex that is in the Active-Update state 901 undergoes the Vertex Update step 306. As the Update phase 202 concludes, a vertex that is now in the Active-Update state 901 will transition to either the Inactive state 900 or the Active-Calculate state 902. If one of the attribute values of a vertex was modified during the Vertex Update step 306, then the vertex remains Active, going to the Active-Calculate state 902 (condition 915). If a vertex's attributes did not change, then the vertex has no more work to perform at present; the vertex moves to the Inactive state 900 (condition 914). A vertex that is now in the Active-Retiring state 903 will go to the Inactive state 900 when the Calculate phase 201 begins (condition 917). In some embodiments and some programmed computations, a vertex that is in the Active-Retiring state 903 does not have any duties, so the Active-Retiring state 903 is behaviorally equivalent to the Inactive state 900.

In some embodiments, the Master 100 can override the usual state transitions and locking some vertices and some edges to be either Active or Inactive throughout the computational process. For example, suppose the process 3000 is used to compute which movies have the highest average interest among the friends of Person P, but that movies in the Horror genre are to be excluded. The Master 100 can accomplish the exclusion by locking all Movie vertices in the Horror genre in the Inactive state.

Example Computation 1: Shortest Path from Start Vertex V11

Figure 10:
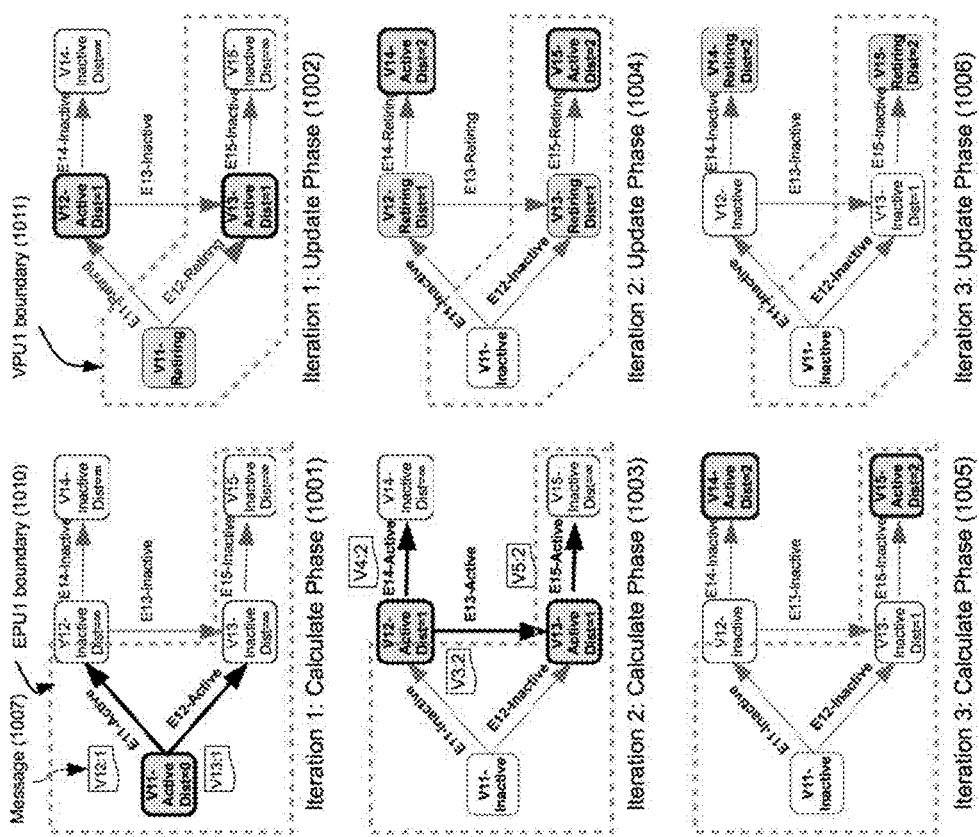
FIG. 10 is an exemplary diagram illustrating one embodiment of the states of an exemplary graph through the phases of the two-phase graph computation method of FIG. 2.

Referring now to FIG. 10, the states of an example graph, comprising vertices V11-V15 and edges E11-E15, at six points in time (snapshots) over the course of an example computation are shown. A Snapshot 1001 shows the example graph at the start of the Calculate phase 201 for the first iteration. The example computation calculates the length of the shortest paths from the vertex V11 to each other vertex. The path length is the number of edges in the path. In some applications, each edge has a Weight attribute, and the path length is the sum of the individual edge Weight values along the path. The unweighted case is equivalent to each edge having Weight=1. This example uses the unweighted edge case.

In this example computation, each vertex has one attribute called Distance. The Master 100 initializes a vertex V11 to have Distance=0 and sets the vertex V11 to be Active. The Master 100 initializes other vertices to have Distance=∞, but these other vertices remain Inactive. The programmed Calculate function for the Edge Calculation step 302 is as follows: every Active edge whose source vertex's Distance value changed since the previous iteration sends a data message to its target vertex, the data message content being the source vertex's Distance value+1. The Vertex Calculation step 303 is not needed for this computation. The programmed Update function for the Vertex Update step 306 is the following: The vertex's Distance attribute is updated to be the least of its current value and the values in the data messages which the vertex receives in this iteration.

The example graph has five vertices (V11 through V51) and five edges (E11 through E15). For this small graph, there are only two EPUs 101 and two VPUs 102. In the left half of FIG. 10, the dotted line 1010 around the edges E11, E12, and E15 indicates that those edges are assigned to EPU1, so all of the remaining edges are assigned to EPU2. Similarly, in the right half of FIG. 10, the dotted line 1011 around the vertices V11, V13, and V15 indicates that those vertices belong to VPU1; the remaining vertices belongs to VPU2.

To start this computation, in the Initialization step 301, the Master 100 sets the vertex V11 to be Active. Because the vertex V11 is the source vertex for the edges E11 and E12, those two edges are automatically Active as well. Thus, EPU1 is Active because EPU1 is responsible for Active edges, but EPU2 is not.

Now referring again to FIG. 10, in the Calculate phase 201 of Iteration 1 (Snapshot 1001), EPU1 is in the Active-Calculate state 902. EPU1 performs the Edge Calculation step 302 on the Active edges E11 and E12. The vertex V11's Distance value is 0, so the edge E11 sends a data message 1007 containing "1" to the edge E11's target vertex V12, and the edge E12 sends a data message with the same distance value "1" to the edge E12's target vertex V13.

In the Update phase 202 of Iteration 1 (Snapshot 1002), the vertices V12 and V13 are now in the Active-Update state 901 because the vertices V12 and V13 received messages. The vertices V12 and V13 are in VPU1 and VPU2, respectively, so both VPU1 and VPU2 are Active. Because the vertex V11 did not receive a data message, the vertex V11 transitions from the Active-Calculate state 902 to the Active-Retiring state 903. According to the programmed function for the Vertex Update step 306, the vertices V12 and V13 each set their Distance attributes to be the least value among their current value and the values in their received data messages. Since the vertices V12 and V13 each received the value "1", and 1 is less than ∞, the vertices V12 and V13 update their Distance attributes to be "1".

When Iteration 2 begins the Calculate phase 201 (Snapshot 1003), the vertices V12 and V13 are Active. The edges E13, E14, and E15 are also Active, because their source vertices are either the vertices V12 or V13. Note that both EPU1 and EPU2 are Active. In the Edge Calculation step 302, Active edges send a data message containing their Distance value+1. Accordingly, the edges E13, E14, and E15 send data messages containing "2" to the vertices V13, V14, and V15, respectively. Consequently, in the Update phase 202 of Iteration 2 (Snapshot 1004), the vertices V13, V14, and V15 are in the Active-Update state 901. Because the vertex V12 did not receive a data message, the vertex V12 transitions to the Active-Retiring state 903. The vertices V14 and V15 update their Distance attributes from "∞" to "2". The vertex V13, on the other hand, according to the rules of this particular computation, does not change its Distance value, because its current value "1" is smaller than the "2" in the received data message from the vertex V12.

At the start of the Calculate phase 201 of Iteration 3 (Snapshot 1005), the vertices V14 and V15 are Active. Because the vertex V13's attribute values did not change in the previous iteration, the vertex V13 is now Inactive. The vertices V14 and V15 do not have any outgoing edges, so no data messages are sent. In the Update phase 202 (Snapshot 1006), no data messages are received. The vertices V14 and V15 transition to the Active-Retiring state 903. All vertices and edges will be Inactive in Iteration 4, and the computation will end.

In some embodiments, the VPUs 102 will recognize that the vertices V14 and V15 do not have any outgoing edges, and so the vertices V14 and V15 will transition to the Inactive state 900 rather than the Active-Calculate state 902 at the start of Iteration 3.

Figure 11:
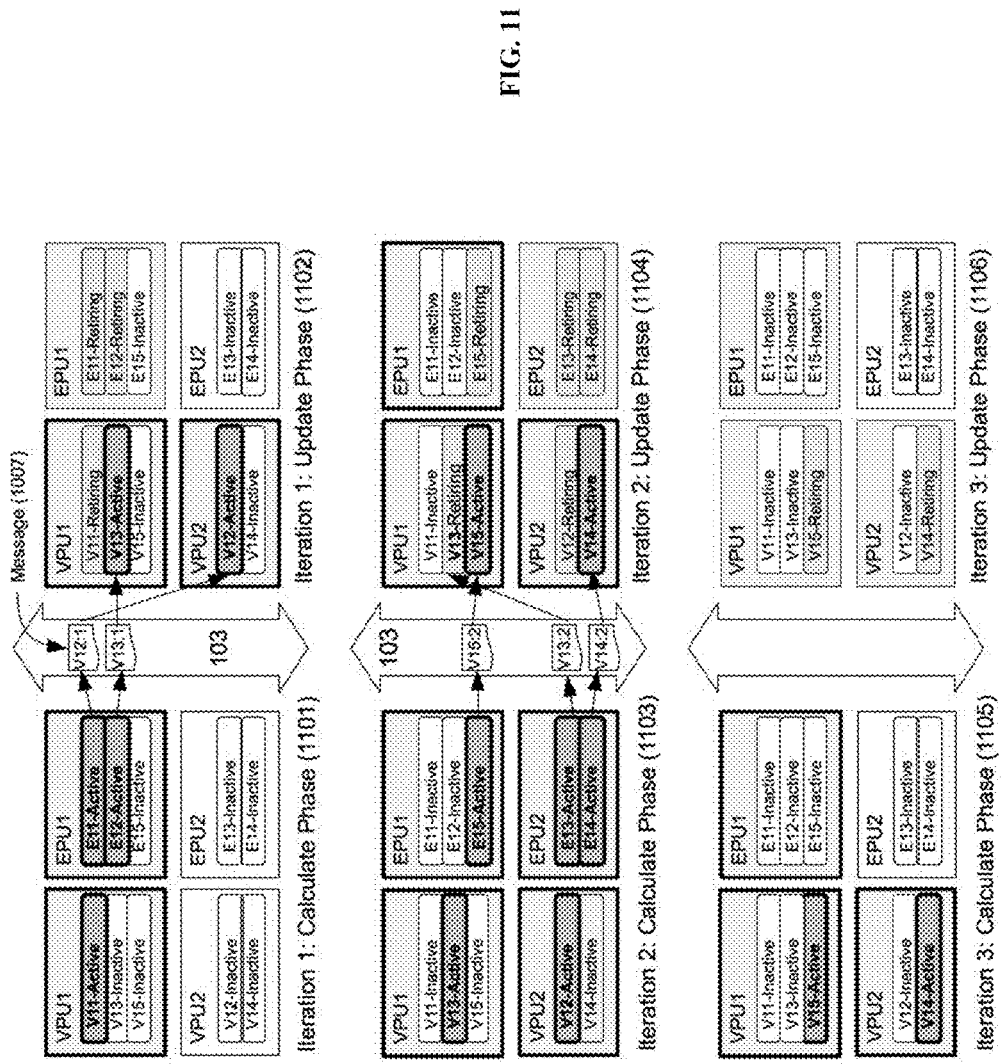
FIG. 11 is an exemplary diagram illustrating another embodiment of the states of an exemplary graph through the phases of the two-phase graph computation method of FIG. 2.

FIG. 11 depicts the same example from a different perspective. FIG. 11 shows the same three iterations, depicting the data structure contents of each EPU 101 and VPU 102. For example, during the Calculate phase 201 of Iteration 1 (Snapshot 1101), the vertex V11 is Active. VPU1 is responsible for the vertices V11, V13, and V15. EPU1 is responsible for the edges E11 and E12, which are Active, and the edge E15, which is Inactive. The vertices in VPU2 and the edges in EPU2 are Inactive. The Active edges send their messages 1007 via the Data Transfer Network 103. The other stages of the computation are also shown (Snapshots 1102, 1103, 1104, 1105, and 1106).

Example Computation 2: k-Neighborhood Subgraph Extraction

Another common computational task is to identify a k-neighborhood subgraph. That is, given a graph G, a starting vertex V, and a positive integer k, identify all the vertices and their connecting edges, comprising subgraph S, that are no farther than a distance k from the starting vertex V. The parameter k is called the degree of separation in some sociological contexts. This computation has many useful applications, in social network analysis, product recommendation, medical and biological sciences, and criminology.

The procedure for this computation can be seen as a modification of Breadth First Search, a common graph computation that also forms the basis for the shortest distance computation. Each vertex has a Distance attribute. During the Initialization step 301, the Master 100 sets Distance=0 in the vertex V and Distance=∞ in all other vertices. At the start of the first iteration, the vertex V is the only Active vertex. During the Calculate phase 201, each Active edge sends the data message (Source_distance+ E_length) to the Active edge's target vertices. Source_distance is the source vertex's Distance attribute value. E_length is the length attribute of the edge, if edges have such an attribute. If edges are unweighted, then E_length=1. In this example, all edge lengths are positive and finite.

During the Update phase 202, each vertex U that received a data message is processed as follows: the VPU 102 responsible for the vertex U compares all the distance values addressed to the vertex U received in the current iteration. If the smallest received value for (Source_distance+E_length) is smaller than the own current Distance value and also is smaller than k, then the VPU 102 updates the vertex U's Distance to be that lesser value. In the first iteration, since all initial values of Distance are infinity, all messages contain a smaller Distance. Hence, in the first iteration, every vertex that receives a message will be updated. Each VPU 102 enters the Active-Update state 901 if one of its vertices updates the vertex's Distance value. So, vertices that lower their Distance in the current iteration will send out messages (to inform other vertices of their new Distance value) in the next iteration.

Eventually, every vertex that is no farther than k will receive a data message. The Stop Condition is when the current iteration does not generate any data messages to send.

Example Computation 3: PageRank

PageRank is a common graph measurement, which determines a score for each vertex in a directed graph. The score can be interpreted as authority, where a vertex has high authority if that vertex is referred to by several neighboring vertices who themselves have high authority. PageRank is useful in itself, for identifying important vertices. PageRank is also a building block in many more complex computations that wish to obtain a relative ranking of the vertices. There are several methods for computing PageRank scores. A simple iterative procedure that is well-suited for the system 150 and the two-phase graph computation method 3000 is described here. Each iteration produces a set of rankings that is progressively closer to the steady-state values. An iterative PageRank computation requires two parameters. One is a damping factor B with a value between 0 and 1. A typical value for the damping factor B is 0.85. Another parameter controls when to stop the computation. For simplicity, this example specifies a fixed number of iterations, T.

To initialize the computation, the Master 100 assigns each vertex an initial rank value R(V)=1/N where N is the number of vertices in the graph. Every vertex is Active. Let D(V) be the out-degree of a vertex (V), that is, the number of edges heading outward from the vertex V. In the Edge Calculation step 302, each edge sends out a data message to its target vertex with value R(S)/D(S), where S is the source vertex of the edge. In the Vertex Update step 306, each vertex updates its rank value according to the following equation:

$R(V)=B*$(sum of values in messages received this iteration)$+(1-B)$

The Calculate-Update sequence is repeated T times.

List of Additional Graph Computations

Example Computation 4

The system 150 and two-phase graph computation method 3000 are useful and efficient not only for computations that are already conceived of from a graph perspective, but also for computations that in a conventional relational database setting would require joining large tables. These computations include the following:

Example Computation 5

Find entities that are a specific distance away, such as finding friends of friends (distance=2). In this example, we assume all friendships are two-way relationships, represented by two edges, one going in each direction. In the Setup step 200, the Master 100 sets the desired start vertices to the Active-Calculate state 902. For example, if the user wants to know the friends of friends of a vertex V1 and a vertex V3, then the Master 100 sets the vertices V1 and V3 to the Active-Calculate state. In the first iteration of the Calculate phase 201, each Active edge sends its source vertex ID to its target vertex. In the first iteration of the Update phase 202, each vertex which receives a message gathers the IDs received into a single Friend set.

In the second iteration of the Calculate phase 201, each Active edge sends its Friend set to its target vertex. In the second iteration of the Update phase 202, each vertex combines its received Friend sets into a single FriendOfFriends set.

Example Computation 6

Find the neighbors that are shared by two particular vertices. The neighbors are not necessarily the same type of objects as the initial vertices. For example, the initial vertices could be shoppers and the neighbors could be products that shoppers have purchased. This computation requires only one iteration. In the Setup step 200 the Master 100 sets the two vertices of interest (the "root" vertices) to the Active-Calculate state 902. During the Calculate phase 201, each Active edge sends its source vertex ID to its target vertex. During the Update phase 202, any vertex that receives a message from both of the root vertices is a common neighbor. The common neighbors send a message containing their own ID value to the Master 100.

Example Computation 7

Find pairs of vertices that have a high number or high percentage of neighbors in common. This computation considers all possible pairs of vertices and so is an expansion of the previous example that considered only one pair. This computation requires two iterations. In this example, suppose 5 is the threshold for what is considered a high number of co-neighbors. In the Setup step 200, the Master 100 sets all vertices to the Active-Calculate state 902 and programs the VPUs 102 with the parameter ManyNeighbors=5. In the first iteration of the Calculate phase 201, each edge sends its source vertex ID to its target vertex. To reduce the number of messages, each EPU 101 can bundle its messages into one packet per target VPU 102 rather than per target vertex. In the first iteration of the Update phase 202, each VPU 102 builds a set of all the senders for each vertex. For example, if the vertices V1, V3, and V4 send messages to the vertex V8, then the vertex V8's sender set is {V1, V3, V4}.

In the second iteration of the Calculate phase 201, each edge sends a two-part message back to each sender. The first part is the source vertex ID. The second part is the sender set minus the sender itself back to each sender. Continuing with the previous example, the edges emanating from the vertex V8 send the message {V8: V1, V3} to the vertex V4, the message {V8: V1, V4} to the vertex V3, and the message {V8: V3, V4} to the vertex V1. In the second iteration of the Update phase 202, each vertex counts how many times each vertex ID occurs among the sender sets of the received messages. For example, when the vertex V4 receives the message {V8: V1, V3}, the vertex V4 adds 1 to its tally for "V1" and 1 to its tally for "V3". Optionally, the vertex V4 may track that the vertex V8 was the sender. When all the messages have been received and counted, the counts that are at least as large as ManyNeighbors=5 indicate the vertices with a high number of neighbors in common.

Example Computation 8

Find the net trust or influence between a starting vertex and an ending vertex, where each edge has a weight corresponding to a degree of trust or influence. The computer science academic literature describes several measures of trust or influence that can be computed iteratively in a graph structure.

Example Computation 9

Measure the centrality or betweenness of vertices. Centrality and betweenness are well-known concepts in social network analysis and can be computed iteratively in a graph structure.

In-Memory Processing

In some embodiments, the EPUs 101 and the VPUs 102 are accompanied by fast local memory, such as the DRAM main memory in a computer. In some such embodiments, each EPU 101 copies all or part of its assigned portion of the Edge Table 105 into the EPU 101's local memory, avoiding the need to access the Edge Table 105 via the Data Transfer Network 103 every iteration. Similarly, each VPU 102 copies all or part of its assigned portion of the Vertex Table 106 to the VPU 102's local memory. Each EPU 101 and each VPU 102 advantageously performs computations and updates on its in-memory copy of the tables, which is much faster than working with tables stored on hard disks. During one Calculate-Update sequence, as the attribute values of edges and vertices are modified, the calculation does not necessarily require the EPUs 101 or the VPUs 102 to immediately write these changes back to the Graph Storage Unit 104. The system 150 and the process 3000 are structured to process each edge independently of the other edges. Edges and vertices inform one another about changes in attribute values via the data messages. When a computation is finished, then the local copies of data can be written back to the Graph Storage Unit 104.

Efficiency of Edge-Based Processing

In many graphs, especially those with some foundation in human social networks, the edges are not distributed uniformly among the vertices. Often, a few vertices are hubs, meaning that they serve as endpoint vertices to a high number of edges, while most other vertices connect to a small number of edges. In a conventional vertex-based graph computation system, processors which are responsible for hub vertices take much longer to perform their computational functions than those processors which are responsible for the vertices with low connectivity. This creates a workload imbalance, in which the majority of processors will be waiting for the few hub processors to complete their operations.

In the disclosed system, the presence and use of the EPUs 101 in the Calculate phase 201 advantageously permits simple and effective load balancing. In a preferred embodiment, the Master 100 assigns nearly equal numbers of edges to each EPU 101. Each edge has the same degree of connectivity, one source vertex and one target vertex, so the processing time for a hub edge may be no different than the processing time for a non-hub edge. Thus, each EPU 101 is expected to complete its operations at about the same time.

Efficient Message Delivery and Vertex Access

In some embodiments, the EPUs 101 performing the Edge Calculation step 302 do not send individual data messages after processing each individual edge. Instead, the EPUs 101 wait and bundled together the data messages that are addressed to the same vertex and to the same VPU. In some embodiments and computational applications, the body of combined messages is a simple concatenation of messages. In some other embodiments and computational applications, an additional computation is performed to combine the several individual message bodies into a single message body. The EPUs 101 send their bundled data messages at the end of the Edge Calculation step 302 after processing all Active edges.

In some embodiments, the vertices advantageously use a coordinated numbering and storage placement scheme for highly efficient message addressing and delivery. In such an embodiment, the vertex IDs are consecutive integers, starting with a computationally convenient base number, such as 0. For example, if there is a total of five vertices, their IDs are 0, 1, 2, 3, and 4. Each vertex data structure is assigned an equal amount of storage memory, and the Vertex Table 106 is stored as an array. Thus, a vertex can be accessed via an array indexing scheme. Additionally, the Master 100 assigns each VPU 102 a block of consecutively numbered vertices.

In some embodiments, the first vertex is numbered 0, and the number of vertices assigned to each VPU 102 is a power of 2, with the exception of the last of the VPUs 102. For example, if there are 30 vertices and four units in the VPUs 102, VPU[0] is assigned vertices 0 to 7,
VPU[1] is assigned vertices 8 to 15,
VPU[2] is assigned vertices 16 to 23, and
VPU[3] is assigned vertices 24 to 29.

In such an embodiment, the address of any of the VPUs 102 can be computed with a simple division operation: VPU_address=vertex address/(number_of_VPUs), rounded down to an integer value. In a preferred embodiment, if the number of VPUs is a power of 2, then the division of the vertex address, represented as a binary integer, can be accomplished by simply shifting the vertex address' binary bits.

Embodiments of Stop Conditions

There are several possible conditions that may be used for stopping the iterative Calculate-Update sequence iterations. In some embodiments, a Stop Condition is met when the system has repeated the Calculate-Update sequence a predetermined maximum number of times. In some embodiments, a Stop Condition is met when no vertex attribute values or edge attribute values have changed in this iteration. In some embodiments, a Stop Condition is met when the magnitudes of vertex value changes or edge value changes are smaller than some limit. In some embodiments, the Master 100 may generate or receive a Stop request due to conditions other than the graph data values. Possible non-graph conditions include a human user canceling the graph computation or an error being detected in a component.

In some embodiments with a fixed number of iterations, the Master 100 maintains control and stops the system 150 globally. However, this may not be desirable if there is not an efficient way to send a global Stop message to all the EPUs 101 and the VPUs 102. In alternative embodiments, the data messages contain a numeric variable for counting the number of iterations. Each EPU 101 and VPU 102 increments its copy of the count variable with each iteration and will know to Stop when its count value reaches the target value. In some embodiments, the count variables are initially set to the target number of iterations and the values are decremented with each iteration. In this case, the EPUs 101 and the VPUs 102 halt when the count value reaches zero.

Embodiment of Directed Graphs and Propagating Active State

In some embodiments, each edge is directed, with a designed source vertex and target vertex. In some such embodiments, the flow of processing obeys the directionality of the edges. For example, suppose there is an edge E1=(V1, V2), meaning the vertex V1 is the source vertex and the vertex V2 is the target vertex. Further, suppose that at the start of iteration N, the vertex V1 is Active, and the vertex V2 is Inactive. Because the vertex V1 is Active and is the source vertex for the edge E1, the edge E1 is also Active.

As a part of the Edge Calculation step 302, a directed edge may send a data message to its target vertex. Suppose the edge E1 sends a data message to the vertex V2. When the Edge Calculation step 302 for the edge E1 completes, unless the vertex V1 receives a data message, the vertex V1 will transition to the Active-Retiring state 903. In the Vertex Update step 306, the vertex V2 may be updated. At the start of the next iteration, the vertex V1 will be Inactive and the vertex V2 will be Active. The Active vertex has shifted from the vertex V1 in iteration N to the vertex V2 in iteration N+1, following the direction of the edge. The foregoing is provided as an illustrative example and is not intended to describe all possible embodiments of a directed graph computation method.

Alternative Embodiment for Accessibility of Vertices

In the principal embodiment, a vertex does not have access to the ID of any other vertex, and an edge has ID values only for its two endpoint vertices. Without ID information, messages cannot be addressed, so the flow of processing within the graph may only move from the source vertex of an Active edge to its target vertex. In an alternative embodiment, processing units have access to other IDs and are capable of sending messages to other vertices. As an example, some particular vertices may be of global interest. In one embodiment, the identities of such vertices are stored in a globally accessible portion of the Vertex Table 106. In another embodiment, the IDs of such vertices are passed from Active vertex to other vertices, as part of a data message.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A computer-implemented method for distributed computation of a graph having one or more edges, each of the one or more edges connecting a source vertex and an endpoint vertex, the method comprising:
   reading attribute values of the one or more edges by at least one edge processing unit and of the source vertices of the one or more edges by at least one vertex processing unit, the read attribute values of the one or more edges being stored in an edge list separate from a vertex list that stores the read attribute values of the source vertices of the one or more edges;
   performing calculations on the read attribute values; and
   updating the attribute values of the one or more edges maintained in the edge list and of the endpoint vertices of the one or more edges maintained in the vertex list, said updating based on the performed calculations,
   wherein said performing is an independent process from said updating and does not modify any of the read attribute values, and said at least one edge processing unit and said at least one vertex processing unit are computer-programmable computational devices.

2. The computer-implemented method of claim 1, further comprising maintaining a list of dependencies between read attribute values.

3. The computer-implemented method of claim 2, wherein said updating the attribute values occurs based on the maintained list of dependencies such that there are no conflicts during said performing calculations.

4. The computer-implemented method of claim 1, further comprising partitioning the one or more edges to one or more edge processing units and partitioning the source vertices and the endpoint vertices to one or more vertex processing units.

5. The computer-implemented method of claim 4, wherein the one or more edge processing units work independently of each other and the one or more vertex processing units work independently of each other.

6. The computer-implemented method of claim 1, further comprising transmitting a data message from a selected edge to the endpoint vertex of the selected edge,
   wherein the data message includes at least one of an identification code of the source vertex of the selected edge and an attribute value of the selected edge.

7. The computer-implemented method of claim 6, wherein said updating the attribute values of the endpoint vertices is also based on the transmitted data message.

8. The computer-implemented method of claim 1, wherein each of the one or more edges is one of active or inactive edges, and said reading, performing, and updating are not performed for the inactive edges.

9. The computer-implemented method of claim 1, wherein each source vertex or each endpoint vertex is one of active or inactive vertices, and said reading, performing, and updating are not performed for the inactive vertices.

10. The computer-implemented method of claim 1, wherein the attribute values of the one or more edges further are stored in an edge data structure that includes at least one of an identification of the source vertex of an edge, a memory address of the source vertex of the edge, an identification of the endpoint vertex of the edge, and an edge type of the edge.

11. A system for distributed computation of a graph having one or more edges, each of the one or more edges connecting a source vertex and an endpoint vertex, the system comprising:
one or more edge processing units for reading attribute values of the one or more edges;
one or more vertex processing units for reading attribute values of the source vertices of the one or more edges; and
a graph storage unit for maintaining the attribute values of the endpoint vertices of the one or more edges, wherein the graph storage unit comprises an electronic data storage device, the read attribute values of the one or more edges are maintained in an edge list of the graph storage unit that is separate from a vertex list of the graph storage unit that stores the read attribute values of the source vertices of the one or more edges,
wherein said one or more edge processing units further perform calculations that do not modify any of the read attribute values of the one or more edges and update the attribute values of the one or more edges and of the endpoint vertices of the one or more edges based on the performed calculations, and said one or more vertex processing units further perform calculations on the attribute values of the endpoint vertices, said one or more edge processing units and said one or more vertex processing units are computer-programmable computational devices, wherein said performing calculations is an independent process from said updating.

12. The system of claim 11, further comprising a master processor for maintaining a list of dependencies between read attribute values.

13. The system of claim 12, wherein said one or more edge processing units further update the attribute values based on the maintained list of dependencies such that there are no conflicts during the performing of calculations.

14. The system of claim 12, wherein said master processor further partitions the one or more edges to said one or more edge processing units and partitioning the source vertices and the endpoint vertices to said one or more vertex processing units.

15. The system of claim 14, wherein the one or more edge processing units work independently of each other and the one or more vertex processing units work independently of each other.

16. The system of claim 11, wherein said one or more edge processing units further transmit a data message from a selected edge to the endpoint vertex of the selected edge, and
the data message includes at least one of an identification code of the source vertex of the selected edge and an attribute value of the selected edge.

17. The system of claim 16, wherein said one or more vertex processing units update the attribute values of the endpoint vertices based on the transmitted data message.

18. The system of claim 11, wherein each of the one or more edges is one of active or inactive edges, and said one or more edge processing units do not perform calculations for the inactive edges.

19. The system of claim 11, wherein each source vertex or each endpoint vertex is one of active or inactive vertices, and said one or more vertex processing units do not perform calculations for the inactive vertices.

20. The system of claim 11, further comprising an edge data structure for maintaining the attribute values of the one or more edges that includes at least one of an identification of the source vertex of an edge, a memory address of the source vertex of the edge, an identification of the endpoint vertex of the edge, and an edge type of the edge.

\* \* \* \* \*